United States Patent
Subramanian et al.

(10) Patent No.: US 11,778,309 B2
(45) Date of Patent: Oct. 3, 2023

(54) RECOMMENDING LOCATION AND CONTENT AWARE FILTERS FOR DIGITAL PHOTOGRAPHS

(71) Applicant: INTERNATIONAL BUSINESS MACHINES CORPORATION, Armonk, NY (US)

(72) Inventors: Aparna Subramanian, Plano, TX (US); Shishir Saha, Plano, TX (US); Jonathan D. Dunne, Dungarvan (IE); Kuntal Dey, New Delhi (IN); Seema Nagar, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 624 days.

(21) Appl. No.: 17/017,755

(22) Filed: Sep. 11, 2020

(65) Prior Publication Data

US 2022/0086337 A1  Mar. 17, 2022

(51) Int. Cl.
*H04N 23/60* (2023.01)
*G06N 20/00* (2019.01)
(Continued)

(52) U.S. Cl.
CPC ......... *H04N 23/64* (2023.01); *G06F 18/2113* (2023.01); *G06F 18/2415* (2023.01); *G06N 7/01* (2023.01); *G06N 20/00* (2019.01)

(58) Field of Classification Search
CPC . H04N 23/64; G06F 18/2113; G06F 18/2415; G06N 7/01; G06N 20/00; G06V 2201/10; G06V 20/30
See application file for complete search history.

(56) References Cited

U.S. PATENT DOCUMENTS 7,805,066 B2 *  9/2010  Wexler ............... H04N 23/64
                                                    396/49
8,659,667 B2 *  2/2014  Syed ................ H04N 23/633
                                                    348/207.1
(Continued)

FOREIGN PATENT DOCUMENTS

CN    107835364 A    3/2018
CN    108093174 A    5/2018
(Continued)

OTHER PUBLICATIONS

Chaudhary, et al., "Aesthetic Communities Detection Using Latent Semantic Analysis For Image Enhancement", International Journal of Impact Factor (SJIF): 4.72, vol. 4, Issue 6, Jun. 2017, pp. 1-8.
(Continued)

*Primary Examiner* — Lin Ye
*Assistant Examiner* — John H Morehead, III
(74) *Attorney, Agent, or Firm* — David Spalding

(57) ABSTRACT

Digital photograph filters and associated settings are recommended by an image classification model. A plurality of images and metadata associated with each of the plurality of images are received. Human interaction scores for each of the images are received. Training data is generated classifying the images using the associated metadata and human interaction scores. The training data is used to derive an image classification model for predicting a human interaction score for an image having an unknown human interaction score. At least one recommended image capture setting using the image classification model is determined in response to determining that a user is preparing to capture an image with a device. The recommended image capture setting is displayed on a display of the device.

20 Claims, 4 Drawing Sheets

(51) Int. Cl.
*G06F 18/2113* (2023.01)
*G06F 18/2415* (2023.01)
*G06N 7/01* (2023.01)

(56) References Cited

U.S. PATENT DOCUMENTS

| | | | |
|---|---|---|---|
| 9,014,500 | B2 | 4/2015 | Shuster |
| 9,225,897 | B1 | 12/2015 | Sehn |
| 9,706,111 | B2 | 7/2017 | Saad |
| 9,813,633 | B2 | 11/2017 | Ryan |
| 9,906,704 | B2 | 2/2018 | Majumdar |
| 9,967,457 | B1 * | 5/2018 | Matias .................. G11B 27/10 |
| 9,978,125 | B1 | 5/2018 | Chang |
| 10,602,057 | B1 | 3/2020 | Sehn |
| 2009/0162042 | A1 | 6/2009 | Wexler |
| 2011/0022602 | A1 | 1/2011 | Luo |
| 2016/0203586 | A1 | 7/2016 | Chang |
| 2018/0255238 | A1 * | 9/2018 | Matias .................. G11B 27/10 |

FOREIGN PATENT DOCUMENTS

| | | |
|---|---|---|
| CN | 111614897 A | 9/2020 |
| WO | 2016002299 A1 | 7/2016 |
| WO | 2017080348 A2 | 5/2017 |

OTHER PUBLICATIONS

GPSoftware, "Directory Opus 10, Picture Properties," GPSoftware, Brisbane 2001-2011, pp. 1-2.
Image-Net, "Image-Net," Image-Net.org, Stanford Vision Lab, Stanford University, Princeton University, 2016, pp. 1-1.
Mell et al., "The NIST Definition of Cloud Computing," Recommendations of the National Institute of Standards and Technology, U.S. Dept. of Commerce, Special Publication 800-145, Computer Security Division, Information Technology Laboratory, Sep. 2011, 7 pages.
Tachibanaya, "Description of Exif File Format," Media.Mit.Edu, May 28, 1999, pp. 1-13.
Wikipedia, "High-Dynamic-Range Imaging," WIKIPEDIA.org, https://en.wikipedia.org/wiki/High-dynamic-range_imaging, [accessed Jul. 20, 2020],13 pages.
Zhou, et al., "Places, the Scene Recognition Database," MIT Computer Science and Artificial Intelligence Laboratory, 2015, pp. 1-2.
International Search Report and Written Opinion of International Application No. PCT/CN2021/117145, dated Nov. 26, 2021, 9 pages.

\* cited by examiner

RECOMMENDING LOCATION AND CONTENT AWARE FILTERS FOR DIGITAL PHOTOGRAPHS

BACKGROUND

The present invention relates to analyzing and recommending photograph filter settings. More specifically, the present invention is directed to systems and methods for recommending photograph filters on a user interface of a mobile device based on recognizing known locations and objects that satisfy specified criteria.

SUMMARY

Embodiments of the present invention are directed to a computer-implemented method for recommending camera settings. The method may include receiving a plurality of images and metadata associated with each of the plurality of images, and receiving human interaction scores for each of the plurality of images. The method may include generating training data by classifying the plurality of images using the associated metadata and human interaction scores. In addition, the method may include using the training data to derive an image classification model for predicting a human interaction score for an image having an unknown human interaction score. Further, the method may include determining that a user is preparing to capture an image with a device, and, in response thereto, determining at least one recommended image capture setting using the image classification model. The recommended image capture setting may be displayed on a display of the device.

In an embodiment, the generating training data by classifying the plurality of images using the associated metadata and human interaction scores may include: determining a location for each of the plurality of images.

In an embodiment, the generating training data by classifying the plurality of images using the associated metadata and human interaction scores may include: determining a type of scene for each of the plurality of images, and associating the determined type of scene with each of the plurality of images.

In an embodiment, the image classification model for predicting a human interaction score for an image having an unknown human interaction score may be a regression model having multiple vectors and multiple targets.

In an embodiment, the using of the training data to derive an image classification model for predicting a human interaction score for an image having an unknown human interaction score may include deriving a revised image classification model for predicting a human interaction score for an image having an unknown human interaction score. The revised image classification model may be derived by generating supplemental training data and updating the image classification model using the supplemental training data.

Supplemental training data may be generated by: (a) selecting a first image, the first image being of a first scene type; (b) generating two or more test images from the selected first image, wherein each test image is generated using one of two or more different image capture settings; (c) receiving a human interaction score for each the test images from a set of human users; and (d) associating the received human interaction scores with the each of the respective test images.

In an embodiment, the determining at least one recommended image capture setting using the image classification model may include: capturing a first image in a field of view of the camera and determining an image capture setting for the first image using the image classification model.

In an embodiment, the using the training data to derive an image classification model for predicting a human interaction score for an image having an unknown human interaction score may include: (a) receiving an input from a user, wherein the user accepts the recommended image capture setting; (b) capturing an image using the recommended image capture setting; (c) deriving a revised image classification model for predicting a human interaction score for an image having an unknown human interaction score by generating supplemental training data; and (d) updating the image classification model using the supplemental training data. The supplemental training data may be generated by: (a) obtaining a human interaction score for the captured image from one or more human users; (b) associating the human interaction score with the captured image; and (c) updating the image classification model using the supplemental training data.

In accordance with other embodiments, a computer program product is provided for recommending camera settings. The computer program product comprises a computer readable storage device storing computer readable program code embodied therewith, the computer readable program code comprising program code executable by a computer to perform a method. The method may include receiving a plurality of images and metadata associated with each of the plurality of images, and receiving human interaction scores for each of the plurality of images. The method may include generating training data by classifying the plurality of images using the associated metadata and human interaction scores. In addition, the method may include using the training data to derive an image classification model for predicting a human interaction score for an image having an unknown human interaction score. Further, the method may include determining that a user is preparing to capture an image with a device, and, in response thereto, determining at least one recommended image capture setting using the image classification model. The recommended image capture setting may be displayed on a display of the device.

In accordance with yet other embodiments, a computer system is provided for recommending camera settings.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
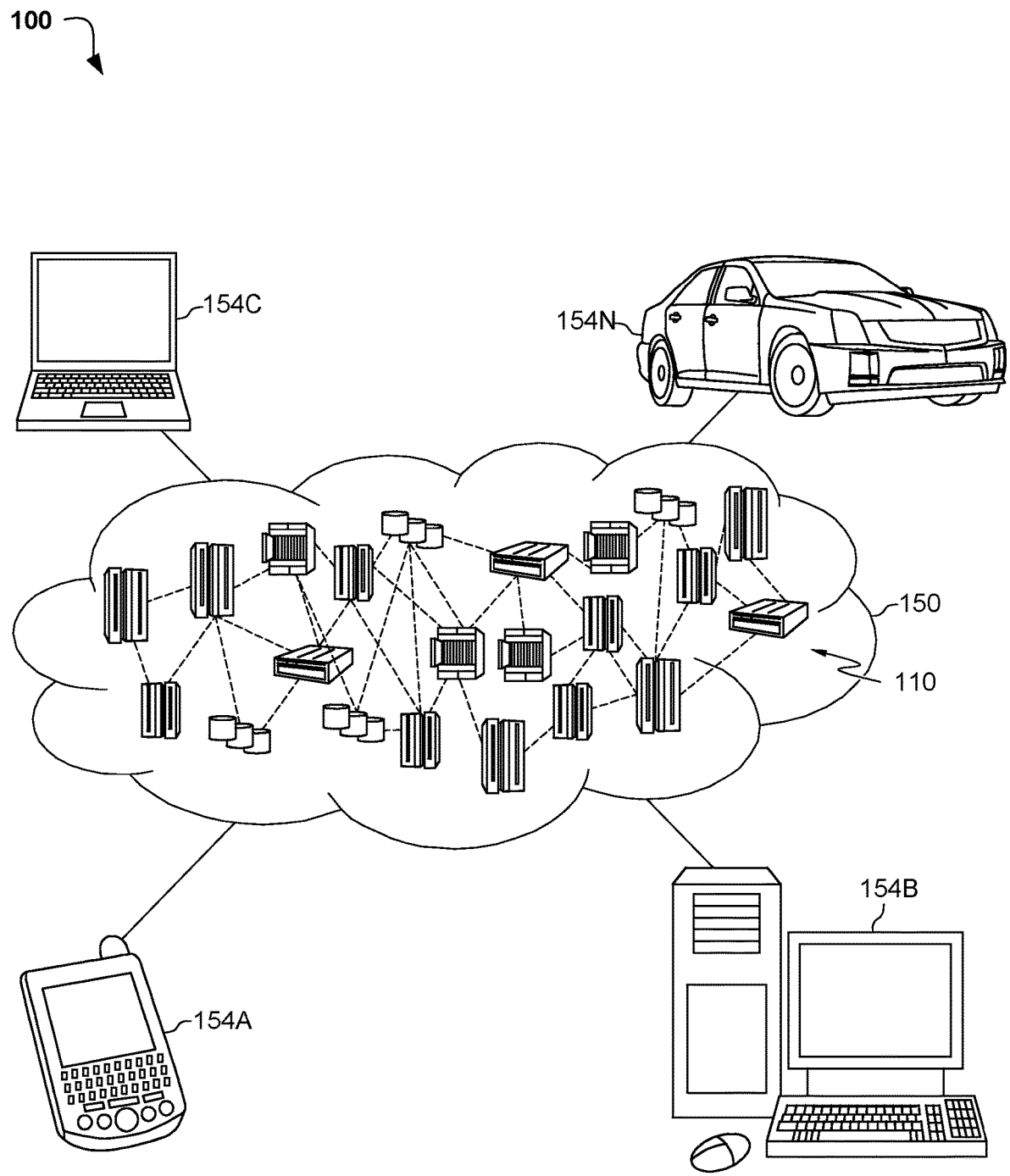
FIG. 1 depicts a cloud computing environment according to an embodiment of the present invention.

Current approaches for presenting and recommending filters for digital photographs to users include presenting static presets which are always available to the user via the software user interface of the device that is taking the photograph. Additional approaches include "auto mode", in which the software analyzes the subject and scene to make adjustments based on, for example, either Bilateral Filtering or Histogram Enhancement. However, while these approaches are based on the latest algorithms available, the settings provided are often a fixed set that do not express an awareness of certain specific real-time conditions and therefore may not appeal to all users. Another example of a feature within the device capturing the image is high-dynamic-range (HDR) imaging, which takes multiple shots of the same scene and merges them to create a single image which averages the tones. This can be helpful but is a post-processing technique that depends on a fixed configuration to function.

To eliminate dependence on preconfigured software presets which do not take into account human interactions with photographs, an image classification model for predicting a human interaction score ("photo-resonance" model) is disclosed. According to various embodiments, the "photo-resonance" model may be derived from analysis of existing online images and their tagged human emotions or crowd sentiments, e.g., "liked" or 'favorites' from social media pages. The generalization of the model could further be used to reposition the filters within the user experience (UX) with the most popular filters at the top or to reconfigure the filters to use preemptive attributes for showing the most popular settings.

By using the "photo-resonance" model according to embodiments, dynamic auto enhancements may be derived and used for reranking photograph filters and associated settings on a camera to recommend only the settings that are popular in the UX. Incorporation into the model of GPS location and analysis of the most popular photographs around the location may provide faster and more accurate creation of auto-enhance presets dynamically. With the incorporation of crowd sentiment analysis, changes in trends of the most popular types or categories of filters at a geographical location can be determined in real-time. The model may use machine learning to improve itself through auto-adjustment and continuously transform the user experience.

In an embodiment, based on the GPS location of the device capturing the image and subject of the photograph, the "photo-resonance" model may analyze other images of the same location and subject to dynamically create a "best" auto-enhance preset to be used in real-time. For example, the most popular images for the cherry blossoms in Washington, D.C. may be analyzed to arrive at a recommended auto-enhance preset which reduces highlights to prevent overexposure of images since the cherry blossoms subject would usually be lighter in color than other elements in the photograph. As another example, in Antelope Canyon, Ariz., the typical main subject of photographs would be red sandstones, meaning that the most popular photographs may have a "warm" feel and the "photo-resonance" model may recommend a setting which enhances the color of the subject sandstones by reducing the intensity of blue pixels. Therefore, it is likely that most of the popular images analyzed by the model would have a lower count of blue pixels and the "photo-resonance" model could arrive at a dynamic 'auto-enhance' preset which recommends settings that provide warm tones.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 150 is depicted. As shown, cloud computing environment 150 includes one or more cloud computing nodes 110 with which local computing devices used by cloud consumers, such as, for example, personal digital assistant (PDA) or cellular telephone 154A, desktop computer 154B, laptop computer 154C, and/or automobile computer system 154N may communicate. In addition, the cloud computing nodes 110 may include a "smart phone" or a digital camera equipped with a processor, memory, a camera, and GPS circuits and modules for location determination (not shown in FIG. 1). Nodes 110 may communicate with one another. They may be grouped (not shown) physically or virtually, in one or more networks, such as Private, Community, Public, or Hybrid clouds as described hereinabove, or a combination thereof. This allows cloud computing environment 150 to offer infrastructure, platforms and/or software as services for which a cloud consumer does not need to maintain resources on a local computing device. It is understood that the types of computing devices 154A-N shown in FIG. 1 are intended to be illustrative only and that computing nodes 110 and cloud computing environment 150 can communicate with any type of computerized device over any type of network and/or network addressable connection (e.g., using a web browser).

Figure 2:
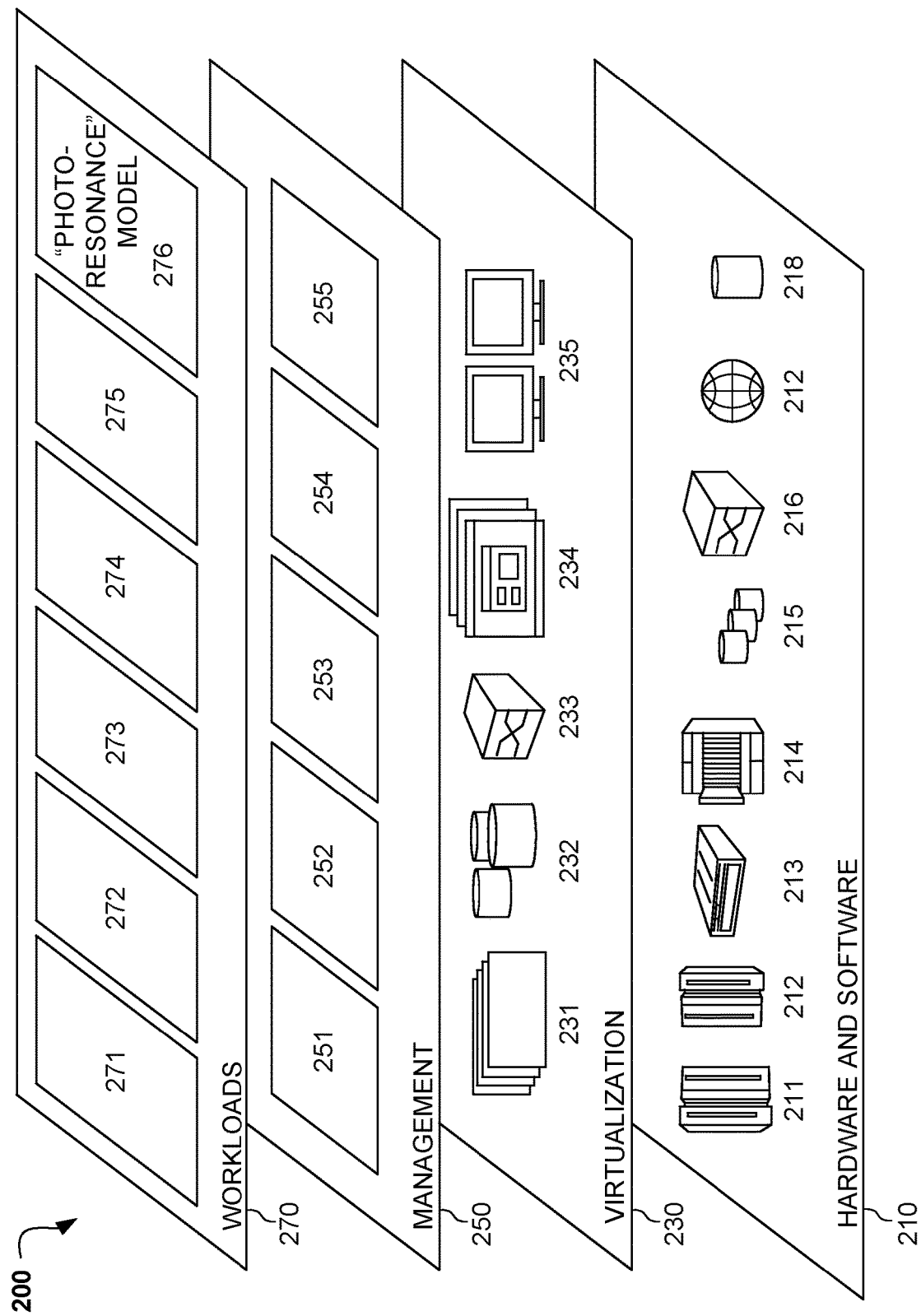
FIG. 2 depicts abstraction model layers according to an embodiment of the present invention.

Referring now to FIG. 2, a set of functional abstraction layers provided by cloud computing environment 150 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 210 includes hardware and software components. Examples of hardware components include: mainframes 211; RISC (Reduced Instruction Set Computer) architecture based servers 212; servers 213; blade servers 214; storage devices 215; and networks and networking components 216. In some embodiments, software components include network application server software 217 and database software 218.

Virtualization layer 230 provides an abstraction layer from which the following examples of virtual entities may be provided: virtual servers 231; virtual storage 232; virtual networks 233, including virtual private networks; virtual applications and operating systems 234; and virtual clients 235.

In one example, management layer 250 may provide the functions described below. Resource provisioning 251 provides dynamic procurement of computing resources and other resources that are utilized to perform tasks within the cloud computing environment. Metering and Pricing 252 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 253 provides access to the cloud computing environment for consumers and system administrators. Service level management 254 provides cloud computing resource allocation and management such that required service levels are met. Service Level Agreement (SLA) planning and fulfillment 255 provide pre-arrangement for, and procurement of, cloud computing resources for which a future requirement is anticipated in accordance with an SLA.

Workloads layer 270 provides examples of functionality for which the cloud computing environment may be utilized. Examples of workloads and functions which may be provided from this layer include: mapping and navigation 271; software development and lifecycle management 272; virtual classroom education delivery 273; data analytics processing 274; transaction processing 275; and "photo-resonance" model 276.

Figure 3:
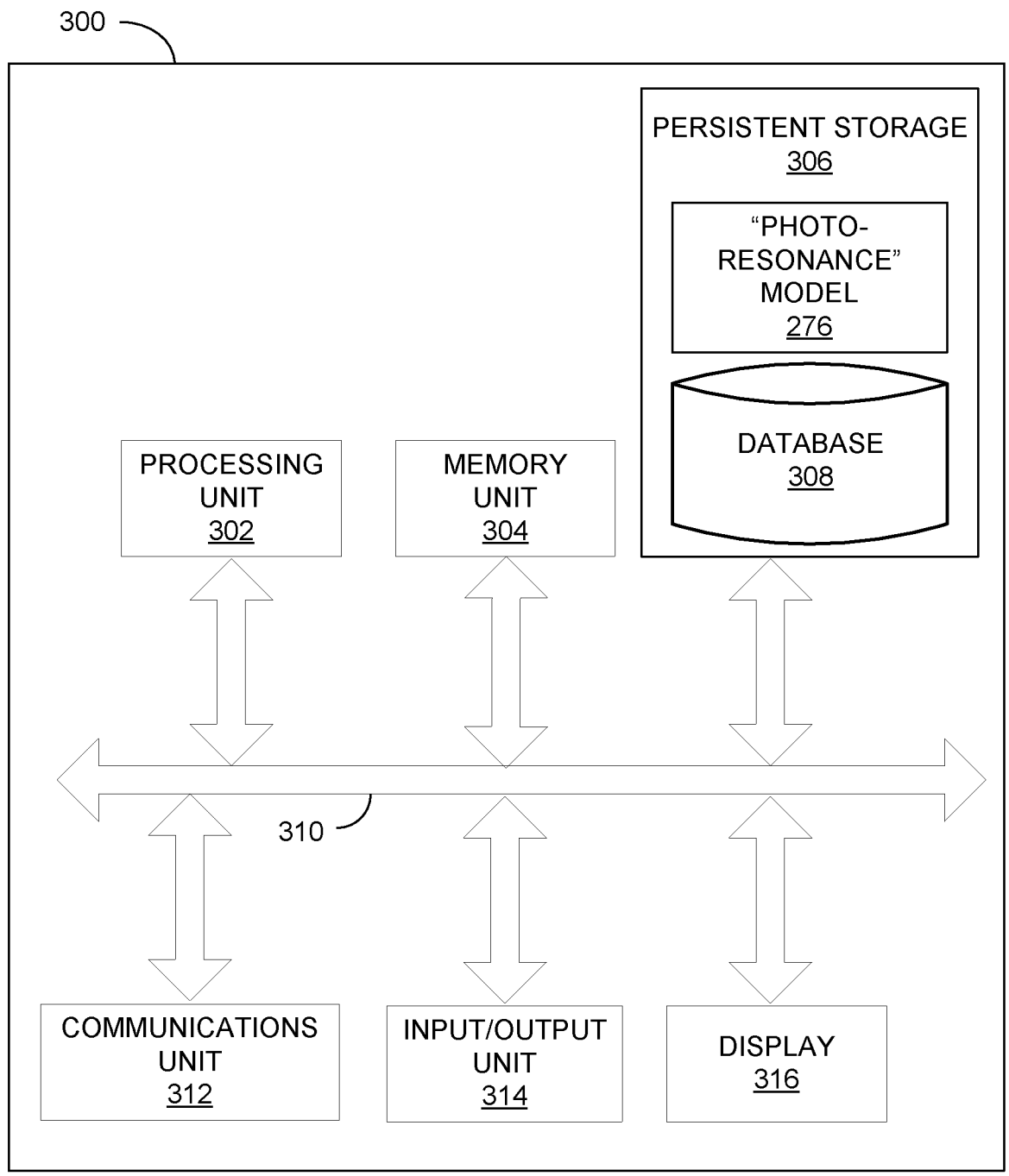
FIG. 3 is a block diagram of an example computer system including persistent storage which may be implemented according to an embodiment.

Referring now to FIG. 3, there is shown a block diagram illustrating a computer system 300 which may be embedded in a cloud computing node 110 in an embodiment. In another embodiment, the computer system 300 may be embedded in a "smart phone" capable of being connected to a network and which is equipped with a camera and a capability for determining location, e.g., a GPS transceiver. In yet another embodiment, the computer system 300 may be embedded in a conventional digital camera capable of being connected to a network and which includes a capability for determining location, e.g., a GPS transceiver. As shown, a computer system 300 includes a processor unit 302, a memory unit 304, a persistent storage 306, a communications unit 312, an input/output unit 314, a display 316, and a system bus 310. Computer programs such as "photo-resonance" model 276 are typically stored in the persistent storage 306 until they are needed for execution, at which time the programs are brought into the memory unit 304 so that they can be directly accessed by the processor unit 302. The processor unit 302 selects a part of memory unit 304 to read and/or write by using an address that the processor 302 gives to memory 304 along with a request to read and/or write. Usually, the reading and interpretation of an encoded instruction at an address causes the processor 302 to fetch a subsequent instruction, either at a subsequent address or some other address. The processor unit 302, memory unit 304, persistent storage 306, communications unit 312, input/output unit 314, and display 316 interface with each other through the system bus 310.

Figure 4:
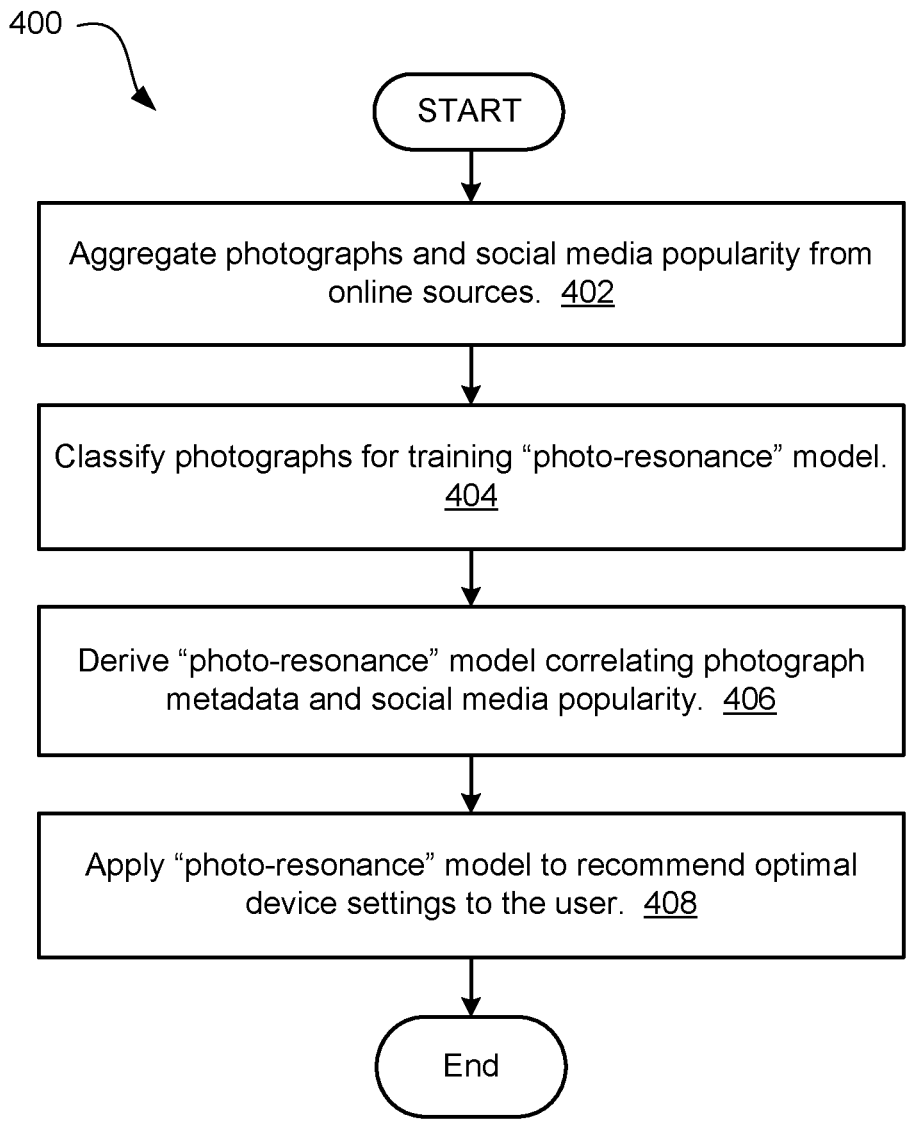
FIG. 4 is a flow chart of a process for recommending location and content aware filter settings for taking photographs using a "photo-resonance" model in accordance with one or more embodiments.

Referring now to FIG. 4, a flow chart of a machine learning process 400 for recommending location and content aware filter settings for taking photographs using a "photo-resonance" model in accordance with one or more embodiments. At 402, the system may aggregate photographs from a variety of data sources, e.g., http://www.image-net.org/ or from social media websites with crowdsourced feedback data. The system may also aggregate social media interactions (e.g., "likes") from images in order to create an initial data set of images and social media feedback for analysis. Links to these images and the associated data may be stored as records in a database.

At 404, the system may assign human interaction, or resonance, scores based on the social media interactions from 402 for each image. The system may also use computer vision or existing convolutional neural network (CNN) trainers and classifiers such as MIT Places 365 to determine and classify the scene being displayed (and, if possible, geographic location) in each image in operation 404. The system may determine the geographic location of the online images either directly from associated image metadata, or through object recognition. Image location data will later be compared with a location of the real-time desired image to determine relevance in the calculation of recommended filter settings. In operation 404, the system may also extract metadata from images using common tools such as exifread in Python and read_exif in the R programming language. Standard photograph file formats such as JPEG (most commonly used in digital cameras and phone processors) or TIFF typically store this metadata as openly available EXIF data within the data file.

Various aspects of the disclosed embodiments require that a photographic image or an image in the field of view of a camera by classified by scene. A plurality of different scenes are contemplated. A "scene" may be defined by how the subjects in an image are framed, e.g., extreme wide angle, wide angle, full (head-to-toe of subject), medium angle, medium close up, close up, or extreme close up. A "scene" may be defined based on the camera angle with respect to the subjects, e.g., at eye level, high angle (camera looking down on subject), or low angle (camera looking up at subject), and the like. A "scene" may be defined based on visual elements in the frame, e.g., inanimate natural elements like trees, mountains, rivers, lakes, snow, rain, season, rocks, sand, grass, and flowers. Visual elements in a frame may include animate natural elements like dogs, cats, horses, or birds. Visual elements in a frame may include people. Visual elements in a frame may include man-made objects, like houses, buildings, cars, bicycles, walls, boats, etc. Visual elements in a frame may include iconic or widely recognizable man-made objects, like the Eiffel Tower, the carvings of U.S. Presidents at Mount Rushmore, S. Dak., the Washington Monument in Washington, D.C., or the Sleeping Beauty Castle at Disneyland theme park. A "scene" may be defined by its geographic location. Thus, a "scene" may be defined based on one or more of these shot types, visual elements, and geographic location. It should be appreciated that the possible visual elements is not limited to those listed in this paragraph.

Metadata extracted from image files may include geographic location, camera setting, time of day, day of year, and other pertinent data. Examples of the metadata collected from online images may include the aperture setting (expressed as an F-number) when the image was taken, the contrast setting when the image was taken, the digital zoom ratio used to record the image, which could be expressed as a decimal value or fraction or in text such as 'off' to specify that no digital zoom was used, the camera's exposure bias setting when the image was recorded, usually specified in stops, the exposure program used to record the image (e.g., aperture priority, shutter priority, etc), the exposure time used to record the image, usually specified in seconds as a whole number or a fraction (e.g., ⅕) or a decimal (e.g., 1.8), whether the flash fired when the image was taken, along with any potential special mode used such as "red-eye reduction" and the actual focal length of the lens, typically expressed in millimeters.

Further examples of image metadata include the GPS altitude relative to mean sea level where the picture was taken, where a negative value would indicate that the image was taken below mean sea level, the GPS latitude where the picture was taken, typically specified in degrees, minutes and seconds, in either the northern or southern hemisphere, the GPS longitude where the picture was taken, also usually specified in degrees, minutes and seconds, and either east or west of the prime meridian, the (equivalent) film speed when the image was taken, typically expressed using the ISO scale, the exposure metering mode used when the image was taken (e.g., average, spot, multi-spot), the rotation information stored in the image, usually set by the camera's orientation sensor to reflect the orientation of the camera when the image was recorded, the saturation of the image (typically normal, high or low), the type of scene capture program used by the camera (e.g., standard, night, portrait), the sharpness of the image (e.g., normal, hard or soft), the speed of the shutter when the image was taken, usually specified in seconds as a whole number or a fraction (e.g., ⅕) or a decimal (e.g., 1.8), the distance from the focal point to the subject, usually specified in meters as a whole number or a fraction (e.g., ⅕) or a decimal (e.g., 1.8) and the camera's white balance setting when the image was taken.

In addition, image metadata may include statistics for each of the image channels in a digital image. For example, average color values of pixels in each of the red, blue, and green channels of an RGB image may be provided. In addition to average value, other descriptive statistics such as standard deviation of color channel values may be provided. Metadata may include statistics concerning luma or luminosity of an image, such as average, standard deviation, and variance of luma values of an image. This list is not exhaustive, and the system may collect any metadata that is available about the images.

Lastly at 404, the system may associate the resonance score, GPS location, scene information and the appropriate image metadata collected above with specific photographs and store this together in a database 308 to be used as training data for the "photo-resonance" model.

At 406, the system may derive a "photo-resonance" model using the training data, which may be a multi-vector/multi-target regression model correlating emotions to various data factors from the metadata extracted in 404 including GPS location, scenes, time of day, time of year, color, hue and brightness. In various embodiments, the model may be a support vector machine (SVM). In various embodiments, the model may be a supervised learning model. The model may be used to classify a photograph that was not included in the training data according to resonance score. In other words, the model may predict a resonance score for a photograph having an unknown resonance score. The training data photographs may be ranked by their resonance scores, with only those highest ranked filter settings eventually becoming viable recommendations that will be presented to photographers in real time for a decision to accept the new settings or not. Photographs captured using recommended settings may be presented to others, e.g., in an online social media platform. If photographs with the accepted presets subsequently elicited or evoked positive emotions from the other viewers, those camera settings would be promoted for that scene or type of photograph and used to make changes to the "photo-resonance" model. Presets which are "liked" on average more than similar photographs taken with different camera settings may be promoted up in the results ranking data store. Presets that perform lower on average than similar photographs taken with different camera settings may be demoted in the ranking. The higher-ranking presets may be applied more often to the photographs with the expectation of generating more "likes" (positive emotions), while lower-ranking presets may be changed and retried until the performance improves. The ranked results may be tagged based on the classification of the scene analyzed and GPS location.

In various embodiments, the ability of the model to predict a resonance score for a photograph having an unknown resonance score may be validated. If the model fails to predict resonance scores for images generally or images of a particular scene type, the model may be refined, revised or updated by creating a control or test group of frequent online users who have a threshold number of views or interactions on social media. The system may then apply a random set of auto-enhance presets to certain "test" images and feed these back to the group of human testers on social media to learn the changes in emotions under different camera settings or simulated camera settings. If a particular test image using a first setting was "liked" by more people than the same test image using other settings, the first auto-enhance presets may be promoted. The promotion may be done by adding a positive reward value for each instance that the auto-enhance presets are accepted by people. Those images with fewer "likes" may be scored with a negative penalty value and may be removed or changed to create a new auto-enhance preset, which may be shown to the test group again. The expected likelihood of a viewer choosing an image with a particular auto-enhance preset, from the multiple possible auto-enhance presets, would be proportional to the total positive reward value minus the total negative penalty value. In another embodiment, the system may randomly choose or create a new or altered auto-enhance presets and show those to the test group or a subgroup of it. The results may be used to improve the "photo-resonance" model with additional training data.

Operation 408 may be performed in response to a user preparing to take a photograph. The current image properties such as GPS location and scene type may be extracted by the system before the image is clicked using computer vision and the current filter or other device settings may also be determined by the system. The "photo-resonance" model may be applied to create a dynamic auto-enhance preset, which may recommend to the user certain changes to properties such as color, brightness or contrast to bring the image closer to those images that the model has determined to elicit or evoke more positive emotions. In an embodiment, the recommended settings may be shown on the device by repositioning the filters within the UX with the most popular at the top. In another embodiment, the filters on the device could be reconfigured to preemptively show the most popular settings at the expense of the current ones. The user could then choose to accept or reject the recommendations from the "photo-resonance" model.

Once the user has selected their desired filters and other settings and has taken their photograph, the "photo-resonance" model may record the user's choices in accepting or rejecting the recommended settings, as well as the actual settings that were used for the photograph. A signal or indication corresponding with user emotions, e.g., a "like" or other input, for images which use the dynamic auto-enhance preset may be fed back as additional training data into the "photo-resonance" model. The "photo-resonance" model may also record social media emotional data for the settings that were used if they were not recommended by the model.

In various embodiments, derivation or refinement 404 of the "photo-resonance" model may be performed on one or more server computers running in a cloud. Modules of the photo resonance model may then be deployed to smart phones or cameras, which may gather environmental and location parameters to use model to recommend camera settings. In an embodiment, the photo resonance model could be provided as software as a service (SaaS).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for recommending camera settings comprising:

receiving a plurality of images and metadata associated with each of the plurality of images;

receiving human interaction scores for each of the plurality of images;

generating training data by classifying the plurality of images using the associated metadata and human interaction scores;

using the training data to derive an image classification model for predicting a human interaction score for an image having an unknown human interaction score;

in response to determining that a user is preparing to capture an image with a device, determining at least one recommended image capture setting using the image classification model; and displaying the recommended image capture setting on a display of the device.

2. The method of claim 1, wherein the generating training data by classifying the plurality of images using the associated metadata and human interaction scores further comprises:

determining a location for each of the plurality of images.

3. The method of claim 2, wherein the generating training data by classifying the plurality of images using the associated metadata and human interaction scores further comprises:

determining a type of scene for each of the plurality of images; and associating the determined type of scene with each of the plurality of images.

4. The method of claim 1, wherein the image classification model for predicting a human interaction score for an image having an unknown human interaction score is a regression model having multiple vectors and multiple targets.

5. The method of claim 1, wherein the using the training data to derive an image classification model for predicting a human interaction score for an image having an unknown human interaction score further comprises:

deriving a revised image classification model for predicting a human interaction score for an image having an unknown human interaction score by:

generating supplemental training data by:

selecting a first image, the first image being of a first scene type;

generating two or more test images from the selected first image, wherein each test image is generated using one of two or more different image capture settings;
receiving a human interaction score for each the test images from a set of human users;
associating the received human interaction scores with the each of the respective test images; and
updating the image classification model using the supplemental training data.

6. The method of claim 1, wherein determining at least one recommended image capture setting using the image classification model further comprises:
capturing a first image in a field of view of the camera; and
determining an image capture setting for the first image using the image classification model.

7. The method of claim 1, wherein the using the training data to derive an image classification model for predicting a human interaction score for an image having an unknown human interaction score further comprises:
deriving a revised image classification model for predicting a human interaction score for an image having an unknown human interaction score by:
receiving an input from a user, wherein the user accepts the recommended image capture setting;
capturing an image using the recommended image capture setting;
generating supplemental training data by:
obtaining a human interaction score for the captured image from one or more human users,
associating the human interaction score with the captured image; and
updating the image classification model using the supplemental training data.

8. A computer program product for recommending camera settings, the computer program product comprising:
a computer readable storage device storing computer readable program code embodied therewith, the computer readable program code comprising program code executable by a computer to perform a method comprising:
receiving a plurality of images and metadata associated with each of the plurality of images;
receiving human interaction scores for each of the plurality of images;
generating training data by classifying the plurality of images using the associated metadata and human interaction scores;
using the training data to derive an image classification model for predicting a human interaction score for an image having an unknown human interaction score;
in response to determining that a user is preparing to capture an image with a device, determining at least one recommended image capture setting using the image classification model; and
displaying the recommended image capture setting on a display of the device.

9. The computer program product of claim 8, wherein the generating training data by classifying the plurality of images using the associated metadata and human interaction scores further comprises:
determining a location for each of the plurality of images.

10. The computer program product of claim 9, wherein the generating training data by classifying the plurality of images using the associated metadata and human interaction scores further comprises:
determining a type of scene for each of the plurality of images; and
associating the determined type of scene with each of the plurality of images.

11. The computer program product of claim 8, wherein the image classification model for predicting a human interaction score for an image having an unknown human interaction score is a regression model having multiple vectors and multiple targets.

12. The computer program product of claim 8, wherein the using the training data to derive an image classification model for predicting a human interaction score for an image having an unknown human interaction score further comprises:
deriving a revised image classification model for predicting a human interaction score for an image having an unknown human interaction score by:
generating supplemental training data by:
selecting a first image, the first image being of a first scene type;
generating two or more test images from the selected first image, wherein each test image is generated using one of two or more different image capture settings;
receiving a human interaction score for each the test images from a set of human users;
associating the received human interaction scores with the each of the respective test images; and
updating the image classification model using the supplemental training data.

13. The computer program product of claim 8, wherein determining at least one recommended image capture setting using the image classification model further comprises:
capturing a first image in a field of view of the camera; and
determining an image capture setting for the first image using the image classification model.

14. The computer program product of claim 8, wherein the using the training data to derive an image classification model for predicting a human interaction score for an image having an unknown human interaction score further comprises:
deriving a revised image classification model for predicting a human interaction score for an image having an unknown human interaction score by:
receiving an input from a user, wherein the user accepts the recommended image capture setting;
capturing an image using the recommended image capture setting;
generating supplemental training data by:
obtaining a human interaction score for the captured image from one or more human users,
associating the human interaction score with the captured image; and
updating the image classification model using the supplemental training data.

15. A computer system for recommending camera settings, the computer system comprising: one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
receiving a plurality of images and metadata associated with each of the plurality of images;

receiving human interaction scores for each of the plurality of images;

generating training data by classifying the plurality of images using the associated metadata and human interaction scores;

using the training data to derive an image classification model for predicting a human interaction score for an image having an unknown human interaction score;

in response to determining that a user is preparing to capture an image with a device, determining at least one recommended image capture setting using the image classification model; and displaying the recommended image capture setting on a display of the device.

16. The computer system of claim 15, wherein the generating training data by classifying the plurality of images using the associated metadata and human interaction scores further comprises:

determining a location for each of the plurality of images.

17. The computer system of claim 16, wherein the generating training data by classifying the plurality of images using the associated metadata and human interaction scores further comprises:

determining a type of scene for each of the plurality of images; and associating the determined type of scene with each of the plurality of images.

18. The computer system of claim 15, wherein the image classification model for predicting a human interaction score for an image having an unknown human interaction score is a regression model having multiple vectors and multiple targets.

19. The computer system of claim 15, wherein the using the training data to derive an image classification model for predicting a human interaction score for an image having an unknown human interaction score further comprises:

deriving a revised image classification model for predicting a human interaction score for an image having an unknown human interaction score by:
generating supplemental training data by:
selecting a first image, the first image being of a first scene type;
generating two or more test images from the selected first image, wherein each test image is generated using one of two or more different image capture settings;
receiving a human interaction score for each the test images from a set of human users;
associating the received human interaction scores with the each of the respective test images; and
updating the image classification model using the supplemental training data.

20. The computer system of claim 15, wherein determining at least one recommended image capture setting using the image classification model further comprises:

capturing a first image in a field of view of the camera; and determining an image capture setting for the first image using the image classification model.

* * * * *